United States Patent
Odaohhara

(10) Patent No.: US 7,415,621 B2
(45) Date of Patent: Aug. 19, 2008

(54) POWER SUPPLY SYSTEM, COMPUTER APPARATUS AND MAXIMUM POWER CONTROL METHOD

(75) Inventor: Shigefumi Odaohhara, Yamato (JP)

(73) Assignee: LENOVO (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 10/083,186

(22) Filed: Feb. 26, 2002

(65) Prior Publication Data

US 2002/0171398 A1    Nov. 21, 2002

(30) Foreign Application Priority Data

Apr. 18, 2001    (JP) .............................. 2001-120038

(51) Int. Cl.
*G06F 1/26* (2006.01)
(52) U.S. Cl. ..................................... 713/300
(58) Field of Classification Search ................ 713/300, 713/320, 321, 340, 310
See application file for complete search history.

(56) References Cited

U.S. PATENT DOCUMENTS 6,397,340 B2 *   5/2002   Watts et al. .................. 713/322
6,714,016 B2 *   3/2004   Odaohhara et al. .......... 324/427
6,717,434 B2 *   4/2004   Takahashi et al. ............. 326/37
6,721,894 B2 *   4/2004   Maher et al. ................. 713/323

FOREIGN PATENT DOCUMENTS

| JP | 404200238 A | * | 7/1992 |
| JP | 409312935 A | * | 12/1997 |
| JP | 10-063351 | | 3/1998 |
| JP | 10-268986 | | 10/1998 |
| JP | 11-178327 | | 7/1999 |
| JP | 2000330673 A | * | 11/2000 |

* cited by examiner

*Primary Examiner*—John R. Cottingham
(74) *Attorney, Agent, or Firm*—Carlos Bustamante

(57) ABSTRACT

In dealing with degradation in performance of a system unit due to excessive controlling by performing a power consumption control function after power consumption of the system unit actually exceeds a maximum power of a power supply apparatus, the present invention solves the above technological problems, and controls the power consumption of a system unit in a state while making full use of performance of the power supply apparatus.

12 Claims, 7 Drawing Sheets

[Figure 1]
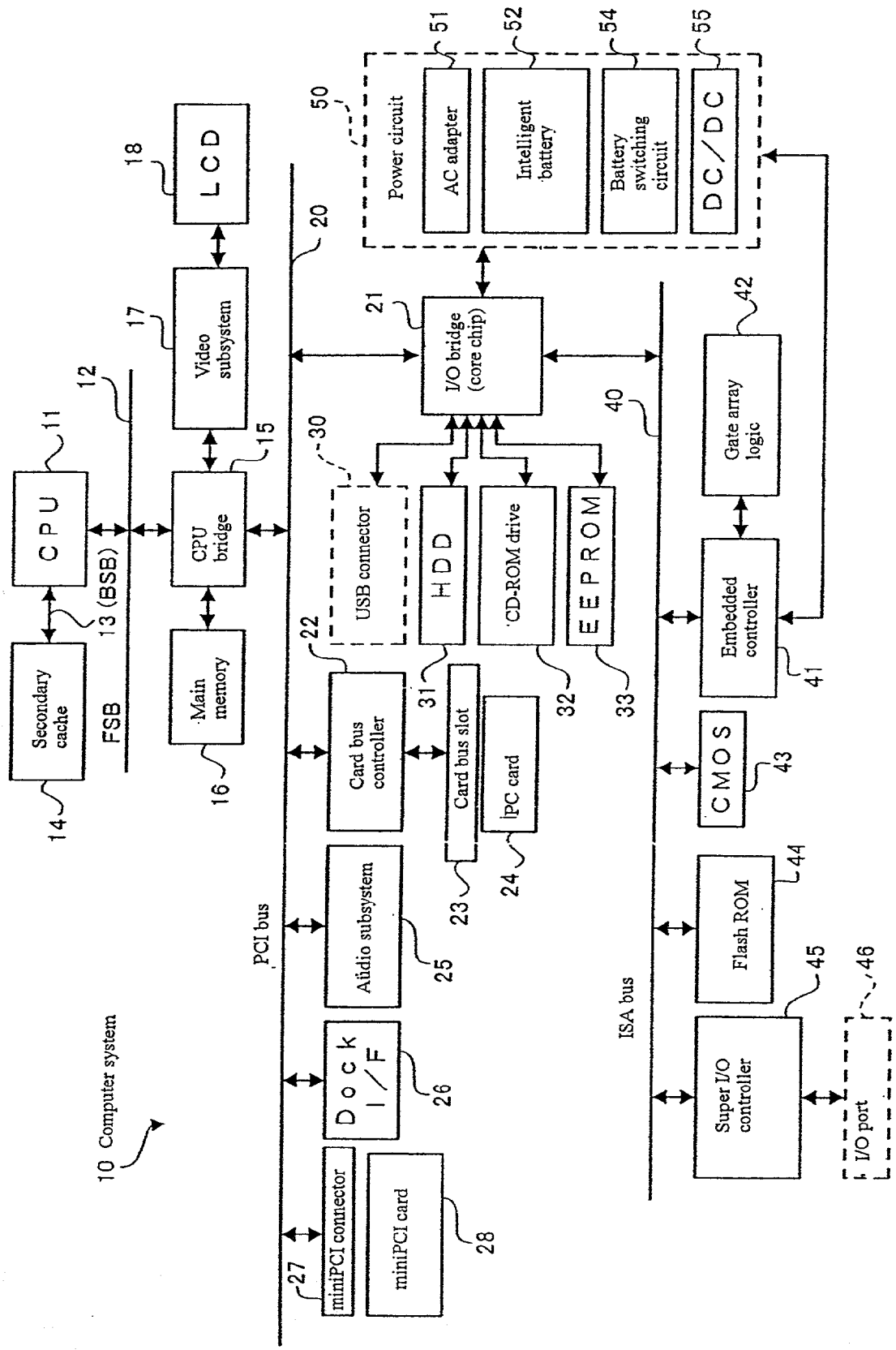

[Figure 2]
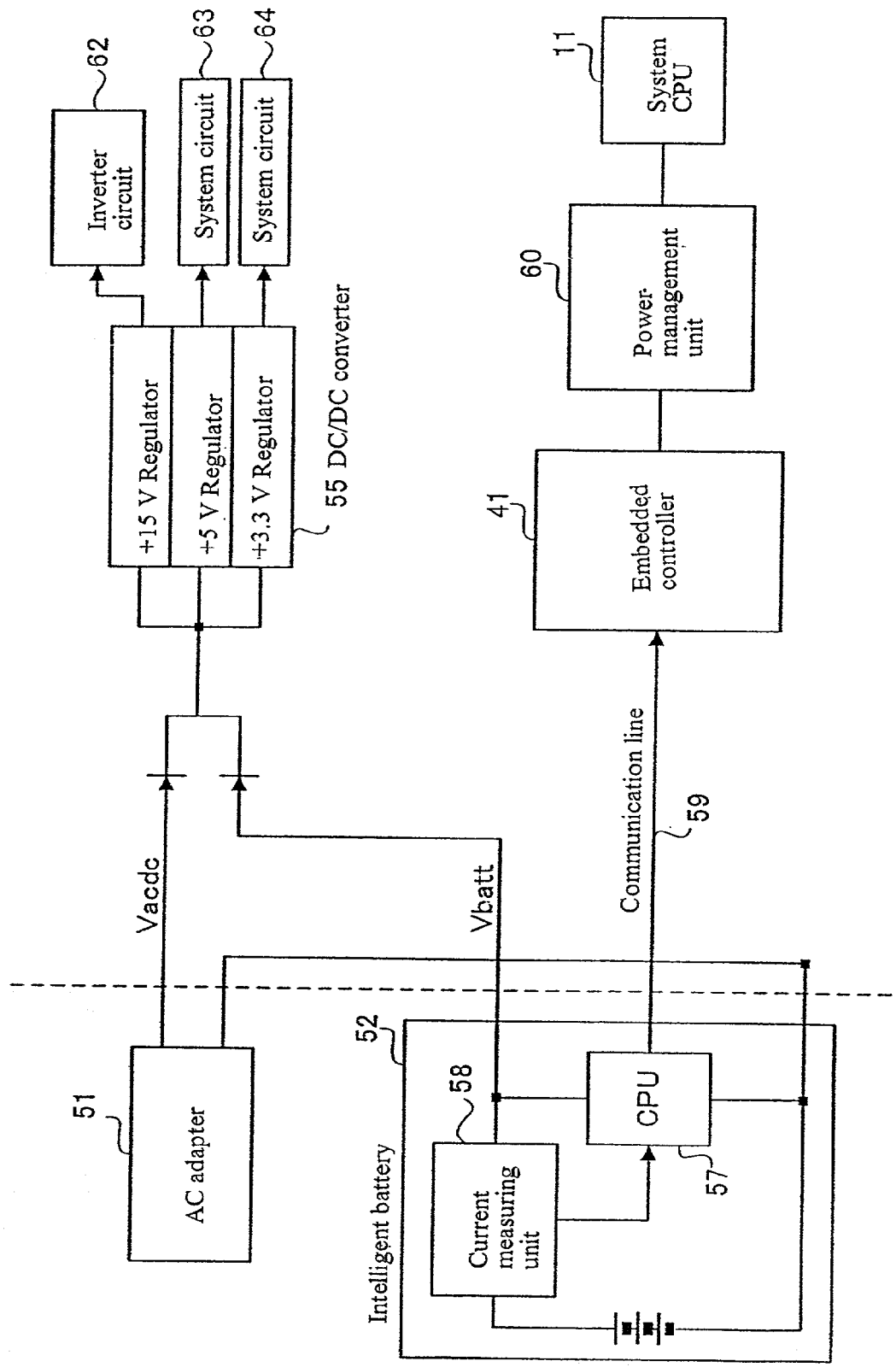

[Figure 3]
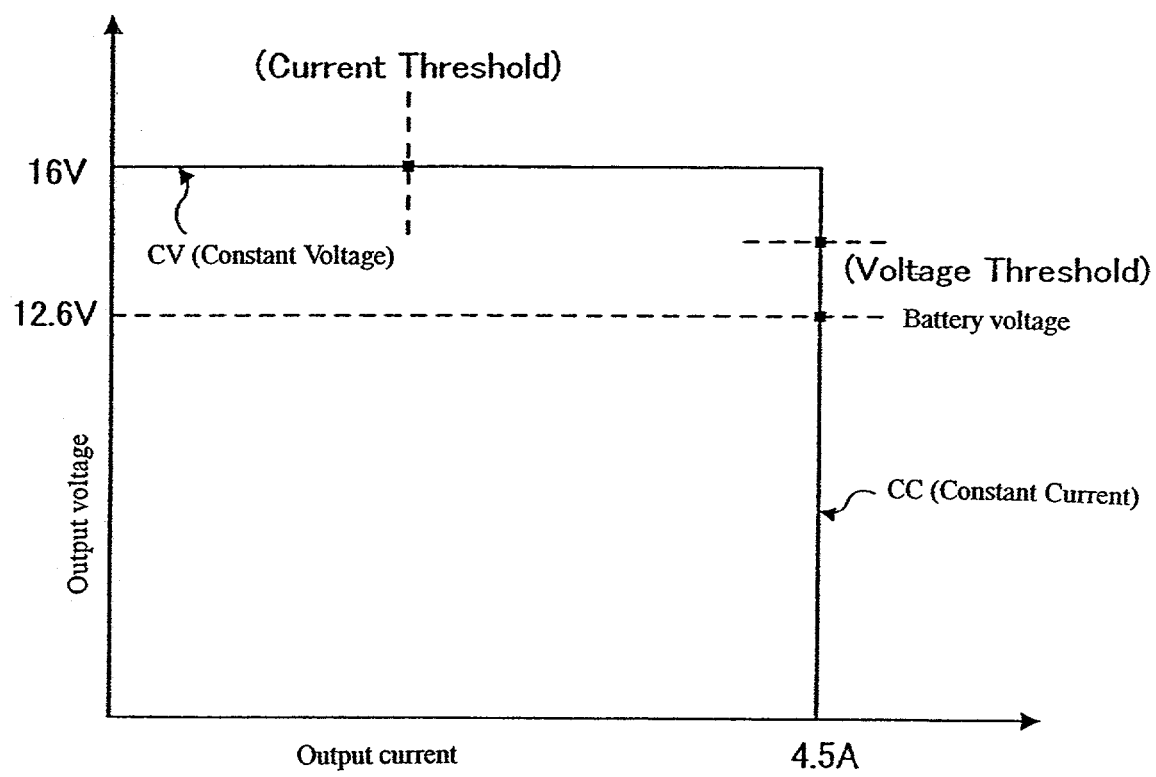

[Figure 4]
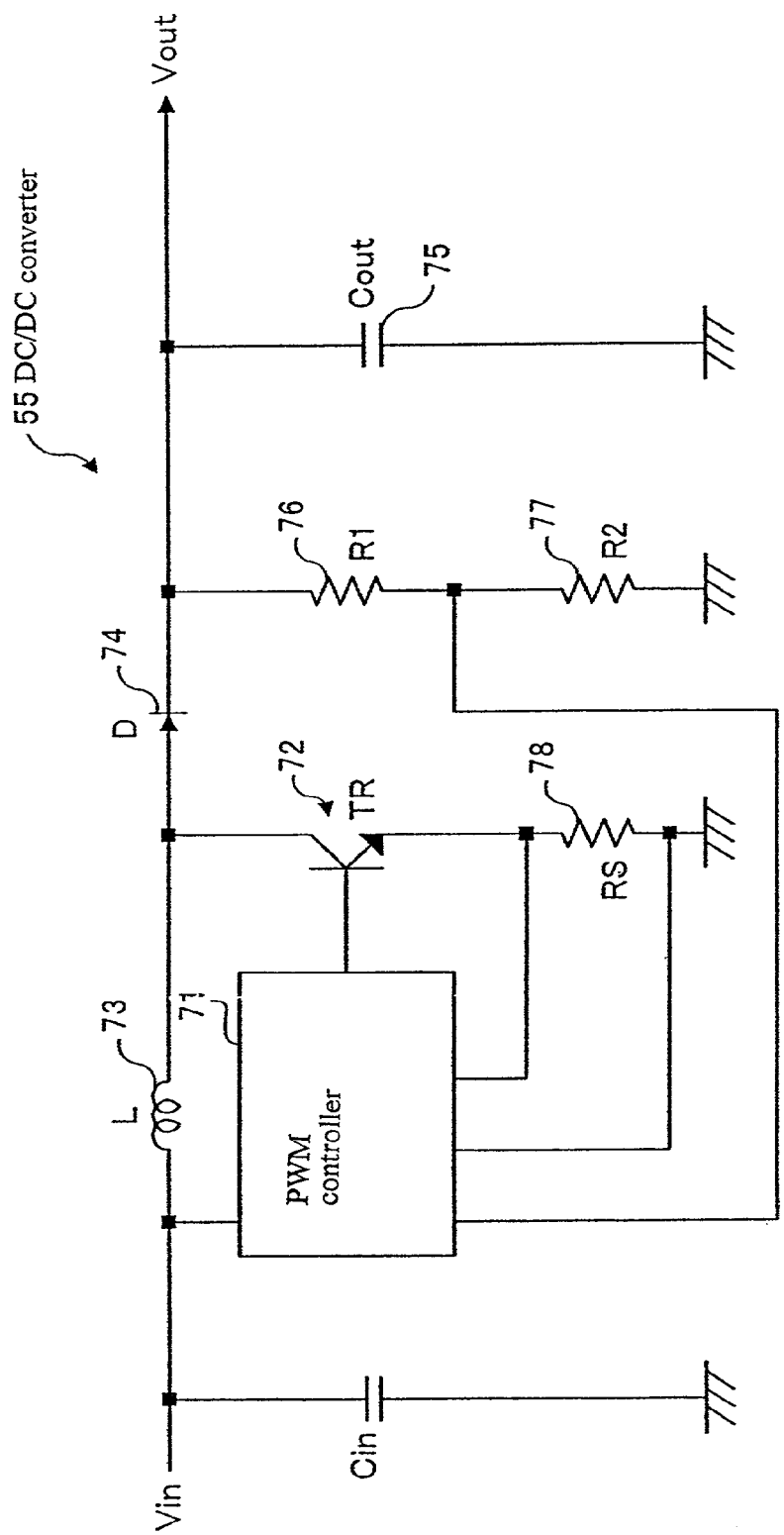

[Figure 5]
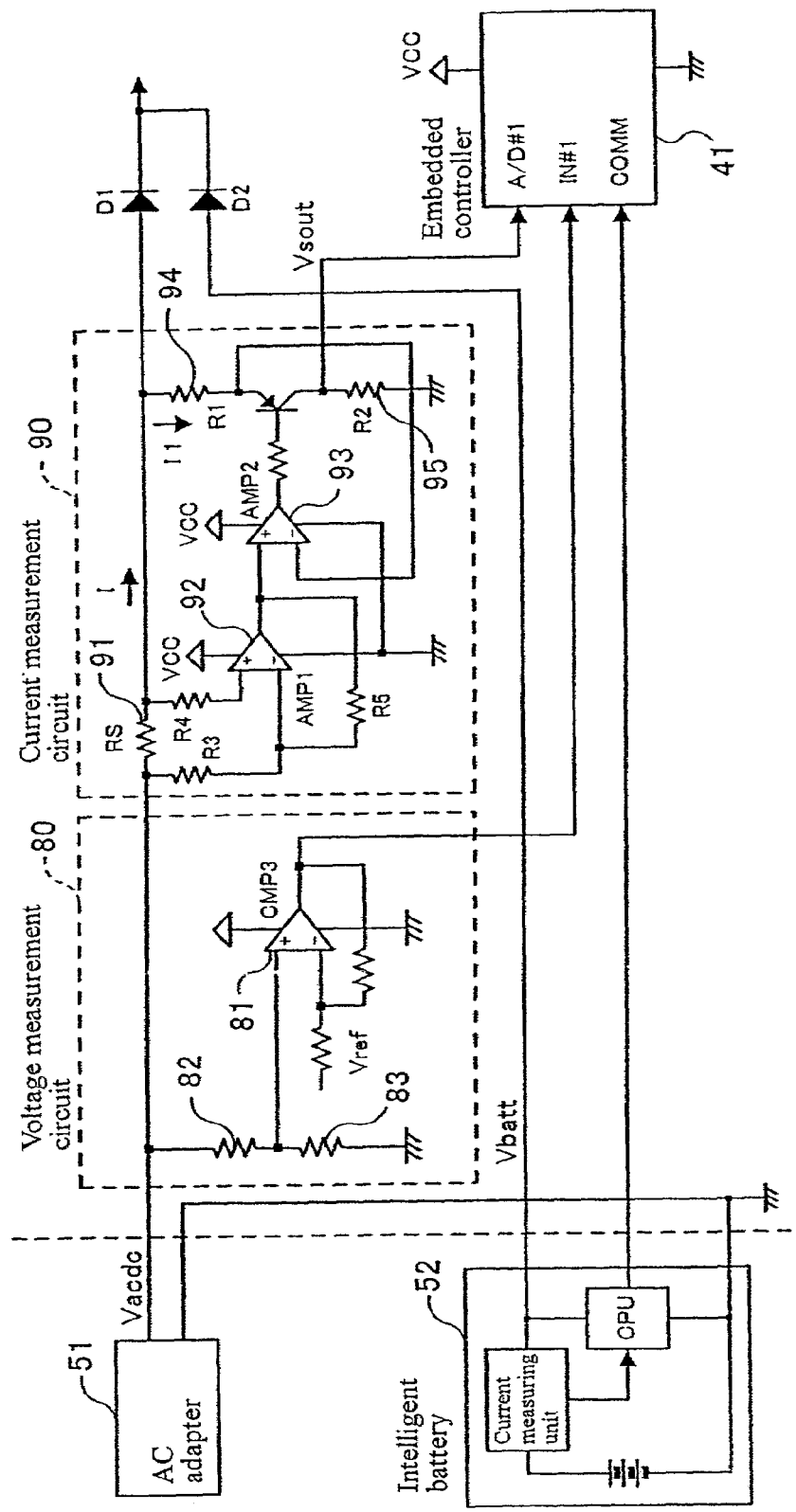

[Figure 6]
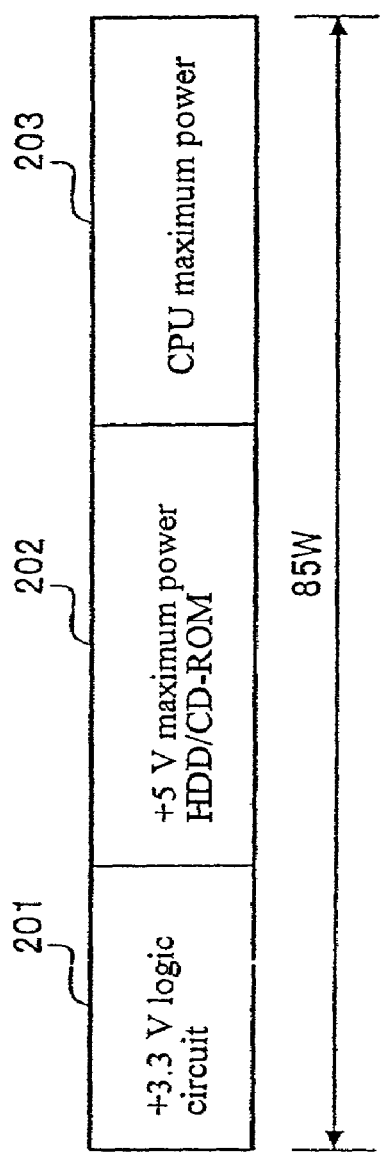
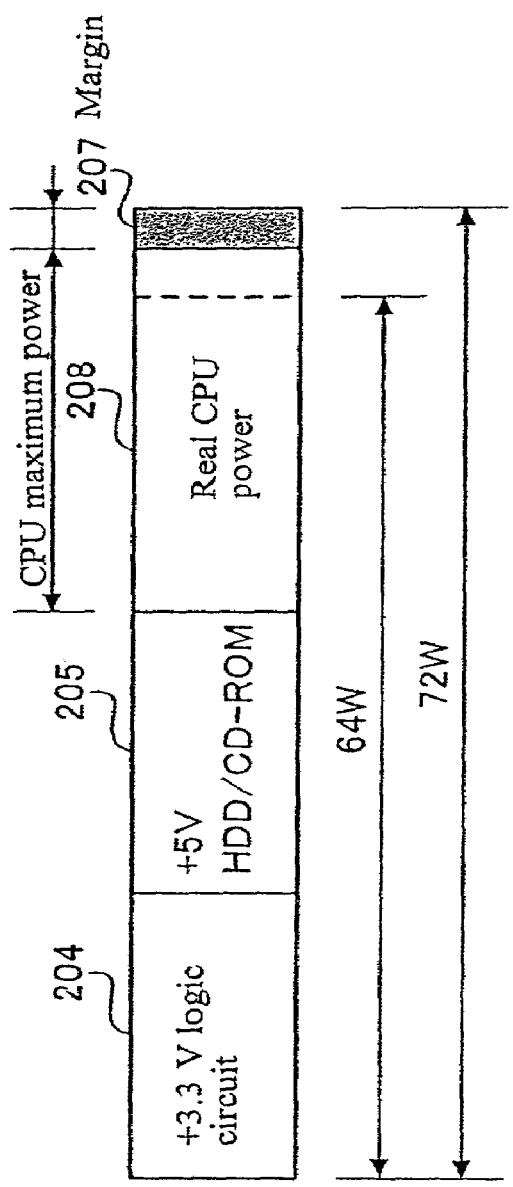

[Figure 7]
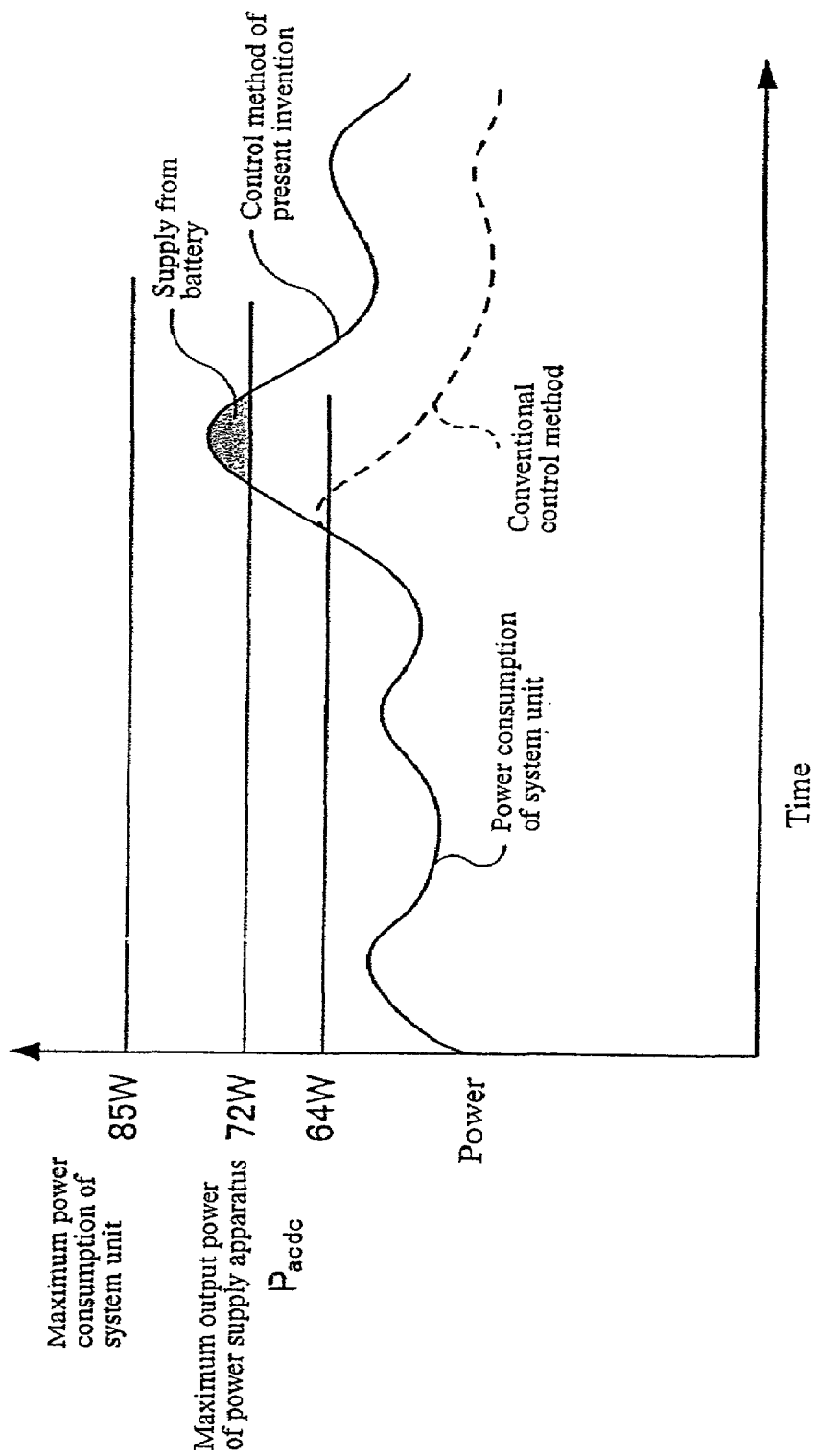

POWER SUPPLY SYSTEM, COMPUTER APPARATUS AND MAXIMUM POWER CONTROL METHOD

BACKGROUND OF THE INVENTION

1. Field of the Invention

The present invention relates to a power supply system for supplying power to a computer from a power supply apparatus and a battery and the like, and in particular, to a power supply system capable of making full use of performance of the power supply apparatus.

2. Description of Related Art

In the case of a computer apparatus represented by a notebook-sized personal computer (notebook PC), a power supply apparatus (power supply section), known as an AC adapter, is connected to the computer apparatus, and it can be connected to a commercial power supply by inserting a power plug on a power cord running from the AC adapter into a plug socket for home use. In addition, there are cases where it is configured such that where the power supply apparatus is built into the computer apparatus, it can be connected to the commercial power supply by inserting a power plug on a power cord running from a housing of the computer apparatus into the plug socket for home use.

Typically, the power supply apparatus represented by the AC adapter is generally large and heavy. As a result, it is highly desired that a power supply apparatus be rendered smaller and lighter, especially when considering the portability of the computer apparatus such as the notebook PC. For that reason, in recent years, attempts have been made to render the power supply apparatus smaller and lighter by reducing maximum output power to a level of minimal inconvenience in a normal working condition. By providing a lowered output, the preparation of a large-scale power supply apparatus capable of completely covering maximum power consumption of a system unit of the computer apparatus is avoided.

However, the maximum output power of the power supply apparatus is often lower than the maximum power consumption, so that voltage of the power supply apparatus abruptly drops if the power consumption of the system unit exceeds the maximum output power of the power supply apparatus such as the AC adapter. There has been a recurring operative problem wherein, due to occurrence of this abrupt voltage variation, the voltage supplied to an inverter of a liquid crystal display (LCD) (inverter input voltage) varies and a lamp current varies, creating a constant flickering in the back light of the LCD.

FIGS. 6A and B are diagrams for explaining a conventional method of controlling the maximum power. FIG. 6A shows the maximum power consumption of the system unit, and FIG. 6B shows the conventional method of controlling the maximum power.

Here, for simplification, in a system circuit configuration the maximum power consumption of the system unit of 85 W is divided into a +3.3V logic circuit portion 201 (which is a portion of little load fluctuation), a +5V maximum power portion 202 (which is a portion in which variation of power of HDD, CD-ROM and the like) and a CPU maximum power portion 203 that is a portion of abrupt power variation.

With regard to the maximum power consumption of the system unit of 85 W shown in FIG. 6A, the conventional method of controlling the maximum power is intended to render the AC adapter that is the power supply apparatus smaller and lighter given the maximum output power is 72 W as shown in FIG. 6B. The control method shown in FIG. 6B further secures a margin 207 as a circuit error in current detection for a +3.3V logic circuit portion 204, a +5V power portion 205 and the CPU maximum power portion 206. The +3.3V logic circuit portions 201 and 204 are values acquired from measured values. In addition, it is often a precondition that a CPU constantly spend the maximum power, using a maximum power specification value of Intel Corp. For such condition, it is intended to avoid exceeding the maximum output power of the AC adapter due to the abrupt power variation. Further, given a current value of the +5V power portion 205, if upon detection, a certain current value is reached or exceeded, it is likely that there is a possibility of exceeding the maximum output power of the AC adapter and that power control is performed (for instance, to lower a CPU clock frequency by power management).

Therefore, in the conventional technology shown in FIG. 6B, controls are employed to prevent flickering of the LCD back light for instance, such that power cannot exceed the maximum output power of 72 W of the power supply apparatus even for a moment, as aforementioned. For such a precondition, the conventional technology shown in FIG. 6B is configured to perform a power management function when the power consumption of the system unit becomes 64 W or so since it must secure the margin 207 as a circuit error in current detection and the actual maximum power of the CPU is approximately 80 percent of the maximum power specification. Consequently, the maximum output power of 72 W of the AC adapter as the power supply apparatus cannot be fully utilized and the control is excessively exerted, which results in lower performance of the entire system.

SUMMARY OF THE INVENTION

The present invention solves the above technological problems, and controls the power consumption of a system unit in a state while making full use of performance of the power supply apparatus.

An object of the present invention is to control flickering of the LCD even in the case where supply power is shifted from the power supply apparatus such as the AC adapter to the battery such as an intelligent battery.

The present invention is able to perform power management operations (power consumption control function) for reducing the power consumption after exceeding the maximum output power of a power supply apparatus such as an AC adapter when a system configuration of the computer apparatus such as the notebook PC is maximized by connecting to a PC adapter, a USB apparatus and the like, and operating a plurality of programs simultaneously.

FIG. 7 is an illustration of the present invention in one particular aspect Conventionally, as shown in FIG. 7, as in the case where the maximum output power of the power supply apparatus Pacdc is 72 W versus the maximum power consumption of the system unit of 85 W, the power consumption control function is performed when the power consumption of the system unit (system side) reaches 64 W, which is lesser. The present invention is configured such that when it reaches 72 W (i.e., the maximum output power of the power supply apparatus), the power consumption control function is performed and the portion of the power that exceeds the maximum output is supplied by the battery.

In one aspect of the present invention, the power supply system to which the present invention is applied comprising a power supply apparatus such as the AC adapter connected to a commercial power supply for supplying power to the main unit (system unit), a battery for supplying power to the system unit in the case where power consumption in the main unit exceeds the predetermined value where power exceeds the maximum output power of the power supply apparatus, and a controller for, after the power consumption in the system unit exceeds the maximum output power of the power supply apparatus, having execution of operation of power consumption control for the main unit started, is provided for. Moreover the maximum output power does not necessarily coincide with a value specified as a standard value for the power supply apparatus. Since the actual maximum output power has a predetermined error to the specified value.

Therefore, in order to control variation of the voltage supplied to a predetermined part of the system unit such as an inverter used for the LCD back light, it is a further aspect of the present invention to also comprise a variation control means such as a step-up type DC/DC converter, for handling issues associated with abrupt variations of the voltage.

In another aspect of the present invention, the computer apparatus comprising a system unit having the CPU for performing data processing, the power supply apparatus connected to the commercial power supply for supplying power to said system unit, an intelligent battery for supplying power to the system unit in the case where power consumption in the system unit exceeds a predetermined value (maximum output power of the power supply apparatus for instance), and the controller having a function of communication with the intelligent battery and also having power management in the system unit executed, in a state of connecting with the power supply apparatus, based on information on discharge acquired from the intelligent battery, is provided for.

Here, for instance, the power management executed by the controller slows down operating speed of the CPU, and the controller exerts control after the elapse of a predetermined time from the slowdown of the speed measured by a timer so as to restore the operating speed of the CPU to a state before execution of the power management that is maximum performance.

In another aspect of the present invention, the computer apparatus comprises a system unit for performing data processing, a power supply apparatus connected to a commercial power supply for supplying power to the system unit, an intelligent battery for supplying power to the system unit in a state where power consumption in the system unit exceeds a predetermined value (maximum output power of the power supply apparatus), a voltage measurement circuit for detecting that an output voltage from the power supply apparatus is lower than a predetermined voltage threshold, and a controller for having operation of power consumption reduction in the system unit executed based on output from the voltage measurement circuit Here, for instance, the apparatus comprises a current measurement circuit for measuring an output current from the power supply apparatus, wherein, upon detecting that the output current from the power supply apparatus is lower than a predetermined current threshold by using the current measurement circuit, the controller has the operation of power consumption reduction for the system unit stopped and the previous operation restored. This predetermined current threshold can be, for instance, a point where the maximum output power from the power supply apparatus is not exceeded even if the operating speed of the CPU of the system unit is rendered maximum.

In another aspect of the present invention, a method of maximum power control for situations where maximum output power from the power supply apparatus connected to a commercial power supply is smaller than maximum power consumption of the system unit for performing data processing, and wherein power is supplied from the power supply apparatus to the system unit, power is supplied from the battery to the system unit in the case where power consumption in the system unit exceeds a predetermined value (maximum output power of the power supply apparatus, for instance), and operation of power consumption reduction for the system unit is started after the power consumption of the system unit exceeds the maximum output power from the power supply apparatus, is provided for. By way of example, the present invention acts to start execution of the operation of power consumption reduction for the system unit where output voltage from the power supply apparatus droops (also used interchangeably herein as "drops") when the power consumption of the system unit exceeds the maximum output power from the power supply apparatus.

Further a method of maximum power control comprising the steps of supplying power from the power supply apparatus to the system unit and supplying power from the battery to the system unit when power consumption in the system unit exceeds a predetermined value and recognizing the discharge current from the battery inside or outside a battery pack constituting the battery so as to start operation of power consumption reduction for the system unit, is provided for.

BRIEF DESCRIPTION OF THE DRAWINGS

FIG. 1 is a diagram showing a hardware configuration of a computer system for a preferred embodiment of the present invention;

FIG. 2 is a diagram showing an overall configuration of a power supply system for a preferred embodiment of the present invention;

FIG. 3 is a diagram showing a characteristic of an AC adapter;

FIG. 4 is a block diagram showing a configuration of a DC/DC converter for a preferred embodiment of the present invention;

FIG. 5 is a diagram showing an overall configuration of the power supply system for a preferred embodiment of the present invention;

FIGS. 6A and B are diagrams for explaining a conventional method of controlling maximum power; and, FIG. 7 is an illustration for a preferred embodiment of the present invention.

DETAILED DESCRIPTION OF THE PREFERRED EMBODIMENT

The present invention will be described hereafter based on the embodiments shown in attached drawings.

Embodiment 1

FIG. 1 is a diagram showing a hardware configuration of a computer system 10 to which the present embodiment is discussed. A computer apparatus having this computer system 10 is configured, for instance, as a notebook PC (notebook-sized personal computer) on which a predetermined OS (operating system) is mounted in compliance with the OADG (Open Architecture Developer's Group) specifications.

In the computer system 10 shown in FIG. 1, a CPU 11 for operating at a predetermined clock frequency for data processing functions as brains for the entire computer system 10, and performs various programs under control of the OS. The CPU 11 is interconnected with various components via three stages of buses, which are an FSB (Front Side Bus) 12 that is a system bus, a PCI (Peripheral Component Interconnect) bus 20 that is a bus for high-speed I/O unit and an ISA (Industry Standard Architecture) bus 40 that is a bus for low-speed I/O unit. The CPU 11 is intended to perform faster processing by storing a program code and data in a cache memory. In recent years, while SRAM of 128 Kbytes or so is integrated as a primary cache in the CPU 11, a secondary cache 14 of 512 Kbytes to 2 Mbytes is placed via a BSB (Back side Bus) 13 that is a dedicated bus in order to complement insufficient capacity. Moreover, it is also possible to cut down costs by omitting the BSB 13 and connecting the secondary cache 14 to the FSB 12 to avoid a package of a large number of terminals.

The FSB 12 and the PCI bus 20 are connected by a CPU bridge (host-to-PCI bridge) 15 that is called a memory/PCI chip. The CPU bridge 15 has a configuration including a memory controller function for controlling an access operation to a main memory 16, a data buffer for absorbing a difference in a data transfer rate between the FSB 12 and the PCI bus 20 and so on. The main memory 16 is a writable memory that is used as a read area for an execution program of the CPU 11 or as a work area for writing processing data of the execution program. For instance, the memory may be comprised of a plurality of DRAM chips, may include 64 Mbytes for instance, or more, or may be expandable up to 320 Mbytes, by way of example. This execution program includes firmware such as various drivers for hardware-operating the OS and peripherals, an application program intended for a specific task, and a BIOS (Basic Input/Output System) stored in a flash ROM 44 mentioned later.

A video subsystem 17 is a subsystem for implementing video-related functions and includes a video controller. This video controller processes a plotting instruction from the CPU 11 and writes the processed plotting information to a video memory, and also reads this plotting information from the video memory so as to output it as plotting data to a liquid crystal display (LCD) 18.

The PCI bus 20 is a bus capable of relatively high-speed data transfer, and is standardized by specifications wherein a data bus width is 32 bits or 64 bits, maximum operating frequencies are 33 MHz and 66 MHz, and maximum data transfer rates are 132 MB/sec and 528 MB/sec. The PCI bus 20 is connected with an I/O bridge 21, a card bus controller 22, an audio subsystem 25, a docking station interface (Dock I/F) 26 and a miniPCI connector 27 respectively.

The card bus controller 22 is a dedicated controller for directly connecting a bus signal of the PCI bus 20 to an interface connector (card bus) of a card bus slot 23, which is capable of loading a PC card 24. The docking station interface 26 is hardware for connecting with a docking station (unillustrated) that is a feature expansion device of the computer system 10. If the notebook PC is set on the docking station, various hardware components connected to internal buses of the docking station are connected to the PCI bus 20 via the docking station interface 26. In addition, a miniPCI card 28 is connected to the miniPCI connector 27.

The I/O bridge 21 has a bridge function of the PCI bus 20 and a ISA bus 40. In addition, it has a DMA controller function, a programmable interruption controller (PIC) function, a programmable interval timer (PIT) function, an IDE (Integrated Device Electronics) interface function, a USB (Universal Serial Bus) function and SMB (System Management Bus) interface function and has a built-in real time clock (RTC).

The DMA controller function is a function of performing data transfer between a peripheral such as an FDD (Floppy Disk Drive) and the main memory 16 without involvement of the CPU 11. The PIC function is a function of having a predetermined program (interrupt handler) executed in response to an interruption request (IRQ) from the peripheral.

The PIT function is a function of generating a timer signal at a predetermined cycle. In addition, an interface implemented by the IDE interface function has an IDE hard disk drive (HDD) 31 connected and also a CD-ROM drive 32 ATAPI (AT Attachment Packet Interface) connected An IDE device of another type such as DVD (Digital Versatile Disc) drive can be connected instead of the CD-ROM drive 32. An external memory such as the HDD 31 or the CD-ROM drive 32 is stored in a storage called a "media bay" or a "device bay" in the main unit of the notebook PC, for instance. There are also cases where such standard external memories are mounted in a manner exclusive and also replaceable with other equipment such as the FDD and battery pack.

In addition, the I/O bridge 21 has a USB port provided, which is connected for instance to a USB connector 30 placed on a wall of the main unit of the notebook PC and so on. Moreover, the I/O bridge 21 has an EEPROM 33 connected via an SM bus. The EEPROM 33 is a memory for keeping information such as a password, a supervisor password and a product serial number registered by a user, and is non-volatile and capable of electrically rewriting stored contents.

Furthermore, the I/O bridge 21 is connected to a power circuit 50. The power circuit 50 has circuits for an AC adapter 51 to be connected to a commercial power supply of AC 100V for performing AC/DC conversion, an intelligent battery 52 as a battery (secondary battery), a battery switching circuit 54 for charging this intelligent battery 52 and switching a power supply route from the AC adapter 51 and the intelligent battery 52, and a DC/DC converter (DC/DC) 55 for generating DC constant voltages such as +15V, +5V and +3.3V used in the computer system 10, for instance.

On the other hand, inside a core chip comprising the I/O bridge 21, an internal register for managing a power supply state of the computer system 10 and a logic (state machine) for managing the power supply state of the computer system 10 including operation of this internal register are provided. This logic sends and receives various signals to and from the power circuit 50, and thereby recognizes an actual feeding state from the power circuit 50 to the computer system 10. The power circuit 50 controls the power supply to the computer system 10 according to instructions from this logic.

The ISA bus 40 is a bus of a data transfer rate lower than that of the PCI bus 20 (for instance, bus width of 16 bits, and maximum data transfer rate of 4 Mbytes/sec). The ISA bus 40 is connected with an embedded controller 41 connected to a gate array logic 42, a CMOS 43, a flash ROM 44 and a super I/O controller 45. Furthermore, it is used to connect peripherals operating at a relatively low speed such as a keyboard and a mouse controller. This super I/O controller 45 has an I/O port 46 connected, and controls driving of the FDD, input and output of parallel data via a parallel port (PIO) and input and output of serial data via a serial port (SIO).

The embedded controller 41 controls an unillustrated keyboard, and is also connected to the power circuit 50 to perform part of a power management function by a built-in power management controller (PMC) together with the gate array logic 42.

FIG. 2 is a diagram showing an overall configuration of a power supply system for the present embodiment The power supply system shown in FIG. 2 includes the AC adapter 51 that is a power supply apparatus (power supply section) to be connected to a commercial power supply, the intelligent battery 52, the DC/DC converter 55 and the embedded controller 41. In addition, FIG. 2 shows a power management unit 60 for determining power consumption control operation (power management operation) of the system unit under instructions of the embedded controller 41, an inverter circuit 62 for receiving output of +15V from the DC/DC converter 55 and lighting a back light of an LCD 18, and system circuits 63 and 64 that are the circuits of the CPU 11 and so on of the computer system 10 for receiving output of +5V and +3.3V from the DC/DC converter 55. The intelligent battery 52 has a current measuring unit 58 together with the CPU 57 provided therein. Moreover, the AC adapter 51 that is a power supply apparatus (power supply section) is generally placed outside the computer apparatus having the computer system 10 built-in in the case of the notebook PC, for instance. However, this embodiment can be applied likewise to a form wherein the power supply apparatus (power supply section) is placed in a housing of the computer apparatus.

Power supply lines (Vbatt, Vacdc) of the AC adapter 51 and the intelligent battery 52 are inputted to the DC/DC converter 55, and are converted into various DC voltages (15V, 5V, 3.3V and so on) required in the computer system 10. The inverter circuit 62 for lighting the back light of the LCD 18 has a DC constant voltage supplied. On the other hand, the intelligent battery 52 has a function of communication with the embedded controller 41 in the system unit (computer system 10), and there is a communication line 59 between the CPU 57 of the intelligent battery 52 and the embedded controller 41. The embedded controller 41 determines the power management operation of the computer system 10 based on information sent from the intelligent battery 52. To start the determined power management operation, it provides an instruction to the power management unit 60 (comprised of a BIOS, an OS and a chip set) to control the power consumed by the CPU (system CPU) 11, that is, the operating speed thereof.

FIG. 3 is a diagram showing a characteristic of the AC adapter 51. The vertical axis is an output voltage, and the horizontal axis is an output current. The output voltage of the AC adapter 51 is 16V, and if it exceeds maximum output power of the AC adapter 51 and reaches the output current of 4.5 A, the output voltage of the AC adapter 51 shifts from a CV (Constant Voltage) characteristic to a CC (Constant Current) characteristic. If it reaches a constant current of 4.5 A, the output voltage lowers from 16V. In this embodiment, this output voltage droops and becomes balanced with a battery voltage of the intelligent battery 52 at the same voltage thereof, and furthermore, a current also starts passing from the intelligent battery 52.

Herein, in the present embodiment, where the power consumption exceeds the maximum output power (72 W for instance) of the AC adapter 51 and the output voltage droops, it is detected by the current measuring unit 58 of the intelligent battery 52 that a discharge current passed from the intelligent battery 52. It is notified from the current measuring unit 58 to the CPU 57 of the intelligent battery 52 that the discharge current passed, and a discharge current value is sent from the CPU 57 to the embedded controller 41 via the communication line 59. The embedded controller 41 can find out that the power consumption exceeded the maximum output power of the AC adapter 51 by recognizing that it was discharged from the intelligent battery 52 in a state where the AC adapter 51 is connected to the system unit.

The embedded controller 41, having recognized that the power consumption exceeded the maximum output power of the AC adapter 51, provides an instruction to the power management unit 60 so as to exert control to reduce the operating speed of the CPU 11 on the system side as operation for power consumption reduction. As a technique of reducing the operating speed of the CPU 11, throttling or adoption of speed stop technology of Intel Corp. can be named, for instance. In this throttling, the operating speed of the CPU 11 is virtually reduced by turning only five out of ten on and turning the others off, for instance. Thus, the power consumption of the entire system can be reduced by lowering the clock frequency of the CPU 11.

If the power consumption is reduced, the output of the AC adapter 51 returns to a CV (Constant Voltage) area. Thereafter, it is checked to see that no discharge current is passing from the intelligent battery 52 by the CPU 57 of the intelligent battery 52 by removing a USB apparatus connected to the USB connector 30 and the PC card 24 from the main unit and stopping the program so as to assume that the power consumption is sufficiently reduced. In such a case, the embedded controller 41 exerts control to restore the operating speed of the CPU 11 to the maximum speed again by way of the power management unit 60. In this embodiment, as the power management function is performed after detecting that the power consumption has actually exceeded the maximum output power of the AC adapter 51, performance of the system unit will not be affected by exerting excessive control. Moreover, it is effective to use a timer, for instance, in order to restore the CPU 11. Exceeding the maximum output of the AC adapter 51 is normally momentary power variation (a few minutes for instance) in many cases. For this reason, it is also possible to operate the system unit in a low power consumption operation by performing the power management function and restore it to the prior maximum performance operation after the elapse of a certain time (10 minutes for instance).

FIG. 4 is a block diagram showing a configuration of the DC/DC converter 55 in this embodiment. This embodiment is characterized, as mentioned above, by exerting control after the power consumption actually exceeded the maximum output power of the AC adapter 51. For this reason, the voltage of the AC adapter 51 varies so that the inverter circuit 62 of a conventional method using that voltage as an input voltage causes flickering. This embodiment is configured so that the DC/DC converter 55 of a step-up type will prevent the screen of the LCD 18 from flickering even if the output voltage from the AC adapter 51 lowers.

The circuit shown in FIG. 4 will be further described hereafter. The output of a fixed frequency oscillator(unillustrated) in a PWM controller 71 passes through a logic circuit (unillustrated) in the PWM controller 71, and turns on and off a transistor (TR) 72 that is a NPN type switching transistor so that current energy will be stored in a coil (L) 73. If the transistor (TR) 72 is turned on, the current increases at the rate of Vin/L to store the energy in the coil (L) 73, and if turned off, the stored energy is discharged at the rate of (Vout-Vin)/L from a diode (D) 74 to an output capacitor (Cout) 75. The output voltage is determined by the amount of energy accumulated on the coil (L) 73, and the amount of energy is controlled by adjusting a peak current of the coil (L) 73. This control is performed by feeding back the output voltage to an error amplifier (unillustrated) in the PWM controller 71 by resistance potentials of a resistance (R1) 76 and a resistance (R2) 77 and amplifying an error as compared with a reference voltage inside.

In a comparator (not shown) in the PWM controller 71, the output of the error amplifier is compared with a volume of a current passing through the coil (L) 73 at the time of switch-on (a current value detected by a current sense resistance (Rs) 78 and a current sense amplifier in the PWM controller 71). The output of this comparator controls the transistor (TR) 72, where the transistor (TR) 72 is turned off if the current value of the coil (L) 73 exceeds the error amplifier output value so as to control the peak current of the coil (L) 73. Thus, in this embodiment, the voltage supplied to the inverter circuit 62 of the LCD 18 that is a predetermined part of the main unit (inverter input voltage) is rendered as a fixed voltage, thus controlling variation of the voltage to the predetermined part of the main unit due to the supply of the power from the intelligent battery 52. Thus, it becomes possible to correct a phenomenon that the input voltage to the inverter circuit 62 abruptly varies and a lamp current varies, and consequently the LCD 18 flickers.

As described above, according to the present embodiment, it becomes possible to recognize that the power consumption of the system unit of the computer system 10 exceeded the maximum output power of the AC adapter 51 by communication from the CPU 57 of the intelligent battery 52 based on the discharge from the intelligent battery 52. This recognition makes it possible to implement maximum power control making the most of the power of the AC adapter 51 in a very simple configuration by performing the power consumption control (power management) function of the system unit. Moreover, it is not always necessary to measure charge and discharge current of the intelligent battery 52 in the battery pack, and it is also possible to configure it by providing the current measurement circuit (it may be the same configuration as a current measurement circuit 90 described in the embodiment 2 mentioned later) in the system so that the embedded controller 41 directly measures the current value.

Embodiment 2

In the embodiment 1, the present invention provided that the current discharged from the intelligent battery 52 was recognizable in the current measuring unit 58 and the CPU 57 communicated with the embedded controller 41 so as to recognize that the maximum output power of the AC adapter 51 is exceeded. For the following preferred embodiment, known as embodiment 2, the present invention provides for recognizing that the maximum output power is exceeded by measuring the voltage or the current of the AC adapter 51.

FIG. 5 is a diagram showing an overall configuration of the power supply system of the embodiment 2. The power supply system shown in FIG. 5 is characterized by providing a voltage measurement circuit 80 for measuring the voltage and the current measurement circuit 90 for measuring the current from the AC adapter 51 on a line for supplying the output voltage Vacdc from the AC adapter 51 to the system unit Measurement results from the voltage measurement circuit 80 and measurement results from the current measurement circuit 90 are supplied to the embedded controller 41.

On the voltage measurement circuit 80, the input on one side of a comparator (CMP3) 81 is a reference voltage Vref, and the input on the other side is the voltage of the AC adapter 51 resistance-divided by resistances 82 and 83. On the voltage measurement circuit 80, these are compared on the comparator (CMP3) 81 and outputted to the embedded controller 41. The embedded controller 41 uses this output from the voltage measurement circuit 80 to detect that the voltage from the AC adapter 51 became less than a Voltage Threshold shown in FIG. 3. This detection allows the embedded controller 41 to recognize that the power consumption of the system unit exceeded the maximum output power of the AC adapter 51.

On the current measurement circuit 90, a potential difference occurs to a resistance (Rs) 91 as current I passes. Assuming that the voltage on the input side (left side) terminal of the resistance (Rs) 91 is Vrs+ and the voltage on the output side (right side) terminal thereof is Vrs−, it is inversely amplified with reference to Vrs− on an operation amplifier (AMP 1) 92 and is inputted to an operation amplifier (AMP 2) 93. The output voltage is converted into current on a resistance (R1) 94, and is rendered as the voltage from GND on a resistance (R2) 95. A ratio is determined by a gain of inverting amplification of the operation amplifier (AMP 1) 92 and the ratio between the resistance (Rs) 91 and the resistance (R1) 94. Current I1 is acquired by the following equation.

$$I1 = \{Rs*I*(R5/R3)\}/R1$$

In this case, the voltage appearing in Vsout is acquired by the following equation.

$$Vsout = I1*R2 = R2*\{Rs*I*(R5/R3)\}/R1$$

Accordingly, the current value can be read by inputting Vsout in the embedded controller 41 and using an A/D conversion function.

Even in the case where the output from the voltage measurement circuit 80 is not used, if it is detected for instance that the output current reached 4.5 A as shown in FIG. 3, it can be understood that the power consumption of the system unit exceeded the maximum output power of the AC adapter 51. If it is recognized by the voltage measurement circuit 80 or the current measurement circuit 90 that the power consumption of the system unit exceeded the maximum output power of the AC adapter 51, the embedded controller 41 can issue a command to the power management unit 60 shown in FIG. 2 so as to slow down the operating speed of the CPU 11 in the system unit as in the embodiment 1. In addition, it is possible to control flickering on the screen of the LCD 18 by the DC/DC converter 55 shown in FIG. 4 even if the output voltage from the AC adapter 51 lowers.

Thereafter, the output of the current measurement circuit 90 is used to restore the operating speed of the CPU 11 after slowing it down. For instance, if the embedded controller 41 detects by using the current measurement circuit 90 that the output current of the AC adapter 51 has become lower than the Current Threshold shown in FIG. 3, the circuit restores the operating speed of the CPU 11 to the maximum speed and returns to the previous operation (a maximum performance state of the system unit). Therefore, the current threshold should be set at a point at which the maximum output power of the AC adapter 51 is not exceeded even if the CPU 11 is set at the maximum speed.

According to the present embodiment, via detection by a voltage drop value of the AC adapter 51 or an output current value thereof, when the power consumption of the system unit of the computer system 10 exceeds the maximum output power of the AC adapter 51 that is the power supply apparatus, is provided for. It becomes possible thereby, even in case of using a battery not having the CPU 57, for instance, to recognize that the power consumption of the system unit exceeded the maximum output power of the AC adapter 51. In addition, it becomes possible, if a consumed current value becomes a certain value or lower in a power management state with lowered power consumption, to perform operation to return to the previous state by determining that it will not exceed the maximum power of the AC adapter 51 even if so.

Thus, the power supply methods described in the embodiments 1 and 2 are configured such that, in the case where the power consumption of the system unit of the computer system 10 exceeds the maximum output power of the AC adapter 51, power is supplied by a battery such as the intelligent battery 52 and the power consumption is reduced by performing the power management function during that time. Thus, while it once exceeds the maximum output power of the AC adapter 51, an initial object of controlling the power consumption of the system unit so that it will not exceeded the maximum output power of the AC adapter 51 can be consequently attained. In addition, maximum performance of the AC adapter 51 can be delivered in this state. Moreover, when a battery such as the intelligent battery 52 is not connected or there is no battery capacity, it is desirable to control the power management function of the system unit so that it will not exceeded the maximum power of the AC adapter 51. This is for the purpose of preventing the system unit from exceeding the maximum power of the AC adapter 51 and shutting down when the battery is not connected or has no capacity.

As described above, according to the present invention, it is therefore possible to perform a power consumption control function after the power consumption of the system unit actually exceeds the maximum power of the power supply apparatus in recognition of degradation in performance of the system unit due to excessive controlling.

What is claimed is:

1. A computer apparatus, comprising:
   a system unit having a CPU for performing data processing;
   a power supply apparatus connected to a commercial power supply for supplying power to the system unit;
   an intelligent battery for supplying power to the system unit in a state where power consumption in the system unit exceeds a predetermined value; and
   a controller having a function of communication with the intelligent battery and also having power management in the system unit executed, in a state of connecting with the power supply apparatus, based on information on discharge acquired from the intelligent battery.

2. The computer apparatus according to claim 1, wherein:
   the power management executed by the controller slows down operating speed of the CPU, and
   the controller exerts control so as to restore the operating speed of the CPU after elapse of a predetermined time from the slowdown of the speed.

3. The computer apparatus according to claim 1, further comprising a DC/DC converter for correcting variation of voltage arising when the output voltage from the power supply apparatus droops and is balanced by battery voltage of the intelligent battery.

4. A computer apparatus, comprising:
   a system unit for performing data processing;
   a power supply apparatus connected to a commercial power supply for supplying power to the system unit;
   an intelligent battery for supplying power to the system unit in the case where power consumption in the system unit exceeds a maximum output power of the power supply apparatus;
   a voltage measurement circuit for detecting that the output voltage from the power supply apparatus is lower than a predetermined voltage threshold; and
   a controller for having operation of power consumption reduction in the system unit executed based on output from the voltage measurement circuit.

5. The computer apparatus according to claim 4, further comprising a current measurement circuit for measuring an output current from the power supply apparatus, wherein, on detecting that the output current from the power supply apparatus is lower than a predetermined current threshold by using the current measurement circuit, the controller makes the system unit stop the operation of power consumption reduction and restore the previous operation.

6. A maximum power control method in the case where maximum output power from a power supply apparatus connected to a commercial power supply is smaller than maximum power consumption of a system unit for performing data processing, wherein:
   power is supplied from the power supply apparatus to the system unit;
   power is supplied from a battery to the system unit in a state where power consumption in the main unit exceeds a predetermined value; and
   operation of power consumption reduction for the system unit is started after the power consumption of the system unit exceeds the predetermined value.

7. The maximum power control method according to claim 6, wherein a characteristic that output voltage from the power supply apparatus droops when the power consumption of the system unit exceeds the maximum output power from the power supply apparatus is caught and execution of the operation of power consumption reduction for the system unit is started.

8. The maximum power control method according to claim 6, wherein, on shifting from supply of power by the power supply apparatus to supply of power by the battery, variation of input voltage supplied to an inverter of a liquid crystal display provided to the system unit is corrected.

9. The maximum power control method according to claim 6, wherein the operation of power consumption reduction slows down operating speed of the CPU performing data processing in the system unit.

10. The maximum power control method according to claim 9, wherein the operating speed of the CPU is restored to the previous operating speed after the elapse of a predetermined time from the execution of the operation of power consumption reduction.

11. A maximum power control method in the case where maximum output power from a power supply apparatus connected to a commercial power supply is smaller than maximum power consumption of a system unit for performing data processing, wherein:
    power is supplied from the power supply apparatus to the system unit;
    power is supplied from a battery to the system unit in the case where power consumption in the system unit exceeds a predetermined value; and
    execution of operation of power consumption reduction for the system unit is started by recognizing a discharge current from the battery.

12. The maximum power control method according to claim 11, wherein recognition of the discharge current is to measure the current discharged from the battery inside or outside a battery pack constituting the battery.

* * * * *